United States Patent
Johnson et al.

(10) Patent No.: US 9,681,320 B2
(45) Date of Patent: Jun. 13, 2017

(54) SYSTEM, APPARATUS, AND METHOD FOR THE MEASUREMENT, COLLECTION, AND ANALYSIS OF RADIO SIGNALS UTILIZING UNMANNED AERIAL VEHICLES

(71) Applicant: PC-TEL, Inc., Bloomingdale, IL (US)

(72) Inventors: Brandon Johnson, Carol Stream, IL (US); James Zik, Mount Airy, MD (US); Atsushi Satoh, Gaithersburg, MD (US); Buchanan Blake, Hampton (GB); Martin H. Singer, Northbrook, IL (US)

(73) Assignee: PC-TEL, INC., Bloomingdale, IL (US)

( * ) Notice: Subject to any disclaimer, the term of this patent is extended or adjusted under 35 U.S.C. 154(b) by 0 days.

(21) Appl. No.: 14/689,979

(22) Filed: Apr. 17, 2015

(65) Prior Publication Data

US 2015/0304869 A1   Oct. 22, 2015

Related U.S. Application Data

(60) Provisional application No. 61/982,856, filed on Apr. 22, 2014.

(51) Int. Cl.
*H04W 24/08* (2009.01)
*G05D 1/00* (2006.01)
*G01S 19/14* (2010.01)

(52) U.S. Cl.
CPC ............. *H04W 24/08* (2013.01); *G01S 19/14* (2013.01); *G05D 1/0011* (2013.01)

(58) Field of Classification Search
CPC ....... H04W 24/08; G01S 19/14; G05D 1/0011
USPC ...................................................... 701/1–3
See application file for complete search history.

(56) References Cited

U.S. PATENT DOCUMENTS

| 5,663,734 | A  |   | 9/1997  | Krasner |
|-----------|----|---|---------|---------|
| 6,868,314 | B1 | * | 3/2005  | Frink ........................ B64C 1/00 244/119 |
| 8,422,461 | B2 |   | 4/2013  | Dickey |
| 8,606,189 | B2 |   | 12/2013 | Guo |
| 8,655,348 | B2 |   | 2/2014  | Zha et al. |
| 8,930,044 | B1 | * | 1/2015  | Peeters ................... B64C 19/00 701/2 |
| 8,989,922 | B2 | * | 3/2015  | Jones ..................... G05D 1/102 701/22 |
| 2003/0218540 | A1 | * | 11/2003 | Cooper .................. G08B 21/12 340/539.26 |
| 2009/0215443 | A1 |   | 8/2009  | Dickey et al. |

(Continued)

OTHER PUBLICATIONS

Search Report for corresponding EP patent application 15164296.4, dated Sep. 18, 2015.

(Continued)

*Primary Examiner* — Jerrah Edwards
*Assistant Examiner* — Majdi Alsomiri
(74) *Attorney, Agent, or Firm* — Husch Blackwell LLP

(57) ABSTRACT

A system, apparatus, and method for the measurement, collection, and analysis of radio signals are provided. A transport host device, including an unmanned aerial vehicle, can transport a scanning device into desired locations for autonomously collecting radio data for a wireless network, thereby enabling the rapid interrogation and optimization the wireless network, including in locations and spatial areas where previously known systems and methods have been impractical or impossible.

31 Claims, 7 Drawing Sheets

(56) References Cited

U.S. PATENT DOCUMENTS

| | | | | |
|---|---|---|---|---|
| 2010/0250030 | A1* | 9/2010 | Nichols | G01C 23/005 701/7 |
| 2012/0303179 | A1* | 11/2012 | Schempf | B25J 11/002 701/2 |
| 2014/0018979 | A1* | 1/2014 | Goossen | G08G 5/0034 701/3 |
| 2014/0022051 | A1* | 1/2014 | Levien | A61M 5/20 340/5.2 |
| 2014/0025236 | A1* | 1/2014 | Levien | G05D 1/00 701/3 |
| 2014/0180914 | A1* | 6/2014 | Abhyanker | G01C 1/00 705/39 |
| 2014/0277854 | A1* | 9/2014 | Jones | G05D 1/102 701/3 |
| 2014/0379173 | A1* | 12/2014 | Knapp | G06Q 10/10 701/2 |

OTHER PUBLICATIONS

2012 LS telcom AG, Antenna RF measurements with a miniature helicopter, retrieved from the Internet: URL: http://www.colibrex.com/fileadmin/content/products_services/spectrum_management/docs/Antenna_RF_measurements_with_miniature_helicopter.pdf SpectrumEdition Feb. 2012, dated Sep. 24, 2012.

Peng Wei et al., Wireless sensor network data collection by connected cooperative UAVs, 2013 American Control Conference(ACC), Jun. 17-19, 2013, pp. 5911-5916.

Luc Haeberle et al., Airborne measurement as new & green technology to verify and enhance broadcasting networks, retrieved from the Internet: URL:http: //www.colibrex.com/fileadmin/content/Colibrex/docs/ABU_DBS_2014_Colibrex-LStelcom.pdf 2014 Colibrex GmbH, dated Mar. 6, 2014.

Extended European search report for corresponding EP patent application 15164296.4, dated Feb. 16, 2016.

Wypych et al., AirGSM: An unmanned, flying GSM cellular base station for flexible field communications, Aerospace Conference, 2012 IEEE, Mar. 3, 2012, pp. 1-9.

Extended European search report for corresponding EP patent application 16185825.3, dated Nov. 3, 2016.

2012 LS telcom AG Spectrum Edition Feb. 2012, "Antenna RF measurements with a miniature helicopter", URL:http: //www.colibrex.corn/fileadmin/content/products_services/spectrum_management/docs/Antenna_RF_measurements_with_miniature_helicopter.pdf, dated Sep. 24, 2012.

Wei et al., "Wireless sensor network data collection by connected cooperative UAVs", 2013 American Control Conference (ACC), pp. 5911-5916, Washington DC, Jun. 17-19, 2013.

Haeberle et al., "Airborne measurement as new & green technology to verify and enhance broadcasting networks", 2014 Colibrex GmbH, Kuala Lumour, Mar. 6, 2014.

Wypych et al., "AirGSM: An Unmanned, Flying GSM Cellular Base Station for Flexible Field Communications", Aerospace Conference, Mar. 3, 2012.

* cited by examiner

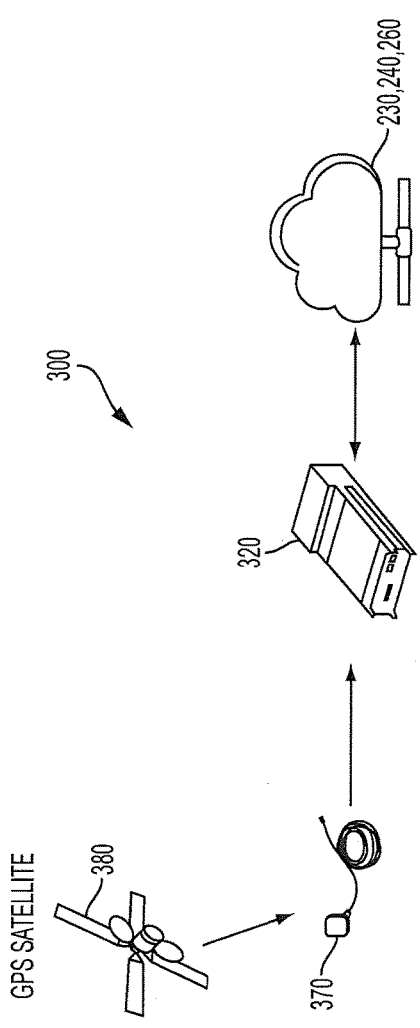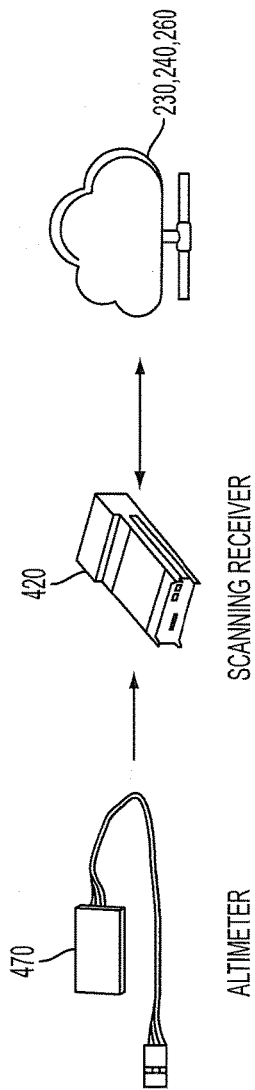
FIG. 3
FIG. 4

SYSTEM, APPARATUS, AND METHOD FOR THE MEASUREMENT, COLLECTION, AND ANALYSIS OF RADIO SIGNALS UTILIZING UNMANNED AERIAL VEHICLES

CROSS-REFERENCE TO RELATED APPLICATIONS

This application claims priority to U.S. Provisional Patent Application No. 61/982,856 filed Apr. 22, 2014 and titled "Method and Apparatus for the Measurement, Collection, and Analysis of Radio Signals Utilizing Unmanned Aerial Vehicles". U.S. Application No. 61/982,856 is hereby incorporated by reference.

FIELD

The present invention relates generally to a system, apparatus, and method for the measurement, collection, and analysis of radio signals. More particularly, the present invention relates to a system, apparatus, and method for the measurement, collection, and analysis of radio signals that utilize unmanned aerial vehicles.

BACKGROUND

It is known in the art that wireless operators must base line and optimize their networks. To do so, radio signal data must be collected in the area of intended coverage, and the collected data must be analyzed for system performance. Some known collection processes have utilized automobiles, rail vehicles, and/or human workers walking or driving to collect data. For example, U.S. application Ser. No. 12/038,437 filed Feb. 27, 2008 and titled "Cellular Drive Test System Network" and U.S. Pat. No. 8,655,348 issued Feb. 18, 2014 and titled "System and Method of Acquiring Network Data" disclose some known collection processes. U.S. application Ser. No. 12/038,437 discloses a drive test system and method, and U.S. Pat. No. 8,655,348 discloses an automated radio data collection system and method that employs fixed location radio sensors and crowd-based data collection systems and methods. Each of U.S. application Ser. No. 12/038,437 and U.S. Pat. No. 8,655,348 is assigned to the assignee hereof and is hereby incorporated by reference.

For many wireless operators, the areas of interest for radio data collection are limited to areas of actual wireless usage. Accordingly, known collection process, including those discussed above, can be adequate when access to locations within the areas of actual wireless usage is straightforward and safe. Indeed, limiting collection to areas of actual wireless usage, which may be a narrow area, can minimize an operator's cost for data collection.

However, in situations in which measurements must be obtained within areas that are beyond those accessed by wireless users, known systems and methods can be ineffective. However, obtaining measurements in such areas could be beneficial for highlighting and preventing wasted resources.

Furthermore, in situations where required measurements are obtained by automobiles, railway vehicles, or human workers traversing routes that are highly repetitive and/or are retraced from previous activities, known systems and methods can be time consuming and cost prohibitive. Moreover, the collected data can be incomplete because the covered area of data collection can be limited by conditions that limit access times, such as road conditions.

Finally, in situations where coverage areas required for data collection are outside of safe human environments, for example, when routes for automobiles, railway vehicles, or human workers to traverse are in highly inaccessible or hazardous locations, known collection processes, including those discussed above, either cannot be used or are ineffective, time consuming and/or cost prohibitive. Indeed, the collected data can be incomplete because the covered area of data collection can be limited to areas where safe human access is provided, such as roads, hallways, stairways, and railways. Furthermore, when the collected data is incomplete, wireless operators may be unable to fully understand their utilization of resources, which can limit their ability to evaluate any unintended resource usage that results in lower coverage within intended areas.

In view of the above, there is a continuing, ongoing need for an improved system, apparatus, and method for the measurement, collection, and analysis of radio signals.

BRIEF DESCRIPTION OF THE DRAWINGS

FIG. 3 is a block diagram of a system in accordance with disclosed embodiments;

FIG. 4 is a block diagram of a system in accordance with disclosed embodiments;

DETAILED DESCRIPTION

Figure 1:
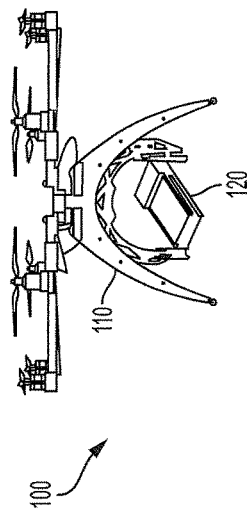
FIG. 1 is a perspective view of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system, apparatus, and method for the measurement, collection, and analysis of radio signals that utilize unmanned aerial vehicles (UAVs) and/or drones. For example, some embodiments disclosed herein can include a UAV with RF scanning capabilities such that sensors can autonomously collect radio data and the UAV can transport the sensors to enable the rapid interrogation and optimization of wireless networks. Indeed, a UAV can enable the deployment of RF collection sensors into spatial areas, such as the interior of buildings, multi-level construction sites, hazardous venues, and other locations where previously known systems and methods that included driving, walking, and the like, have been impractical and/or impossible.

It is be understood that the system, apparatus, and method disclosed herein can be employed in a variety of environments, including, but not limited to, in a building, in an urban environment, and/or in a remote location. Indeed, when the system, apparatus, and method disclosed herein are employed in a building, such as in a stadium or skyscraper or on a campus, network data can be collected in a fraction of the time of known systems and methods, Furthermore, troubleshooting can be easy because trouble areas can be readily identified and dynamically revisited using GPS information. Finally, data can be collected in three dimensions, resulting in enhanced visibility of coverage gaps, interference, and wasted power.

When the system, apparatus, and method disclosed herein are employed in an urban environment, such as in traffic jams or in developing nations, network data can also be collected in a fraction of the time of known systems and methods. Furthermore, other obstacles, such as a lack of regulations, unqualified drivers, poor road quality, and unconnected streets, that are present in developing nations, can be avoided.

When the system, apparatus, and method disclosed herein are employed in a remote location, such as in an oil and gas field, a water coverage area, or in an emergency response location, network data can be efficiently collected as needed. Indeed, in a water coverage area, data can be collected to monitor high traffic areas that are traversed by boats and other marine vehicles. Furthermore, in emergency response locations such as mountains, parks, and camping sites, high risk areas can be scanned and the results of such a scan can be used to determine any emergency coverage needed.

It is to be further understood that embodiments disclosed herein are not limited to UAVs. Instead, embodiments disclosed herein can include a UAV, drone, or any other vehicle or transportation device, for example, an autonomous vehicle, as would be known by those of skill in the art.

In some embodiments, a UAV can be controlled autonomously by an onboard computer. Additionally or alternatively, in some embodiments, a UAV can be controlled by the remote control of a pilot on the ground or in another vehicle. Accordingly, in embodiments disclosed herein, a system, apparatus, or method can be fully or partly automated, as needed, thereby reducing costs associated with RF data collection.

In some embodiments, a UAV can facilitate the performance and execution of radio sensor data collection, analysis, and reporting. For example, FIG. 1 is a perspective view of a system 100 in accordance with disclosed embodiments. As seen in FIG. 1, the system 100 can include a UAV 110 and an integrated scanning device 120, for example, a radio signal sensor system and/or a data collection system. The scanning device 120 can include any known radio signal sensor system and/or data collection system as would be known in the art and can execute any known method for data collection as would be known in the art, including the system and method disclosed in U.S. Pat. No. 8,606,189 issued Dec. 10, 2013 and titled "System and Method for Wideband Wireless System Scanning." U.S. Pat. No. 8,606,189 is assigned to the assignee hereof and is hereby incorporated by reference. In embodiments disclosed herein, during the preprogramming of the UAV 110 and/or during real-time dynamic operation of the UAV 110, the scanning device 120 can monitor and collect received signals using integrated radio sensors, perform preset analysis of received data, store data for future post-processing, and/or report data in real-time using integrated wireless connectivity devices.

In accordance with the above, in some embodiments, the system, apparatus, and method disclosed herein can include a transport host device that can include a UAV, and a scanning device that can include a radio signal sensor system and/or a data collection system, that can include, for example, a software defined radio (SDR) scanner and/or a SDR scanning receiver. The scanning device can be attached to, affixed to, connected to or associated with the transport host device via any method as would be known by those of skill in the art.

In some embodiments, the system, apparatus, and method disclosed herein can generate a flight path for a UAV. Furthermore, in some embodiments, the system, apparatus, and method disclosed herein can use RF output from a scanning device to dynamically create and program a flight path for an associated UAV based on identified and detected points of interest. For example, when a scanning device collects data, the scanning device can store that data for later post-processing and/or perform real-time tracking by processing and analyzing such data to detect points or areas of interest and generate a flight path for an associated UAV based thereon. In accordance with these embodiments, a scanning device can collect data, identify data within a specific range of signal strength, identify locations corresponding to the identified data, and instruct an associated UAV to traverse a flight path that facilitates the re-collection data from each of the identified locations for a more detailed data collection.

To minimize the weight of a UAV in accordance with disclosed embodiments, a battery or other power source or system can be shared between the UAV and the scanning device. For example, in some embodiments, the power source can be carried by the scanning device, and the scanning device can include a power outlet that can connect with the UAV for transmitting power thereto.

Figure 2:
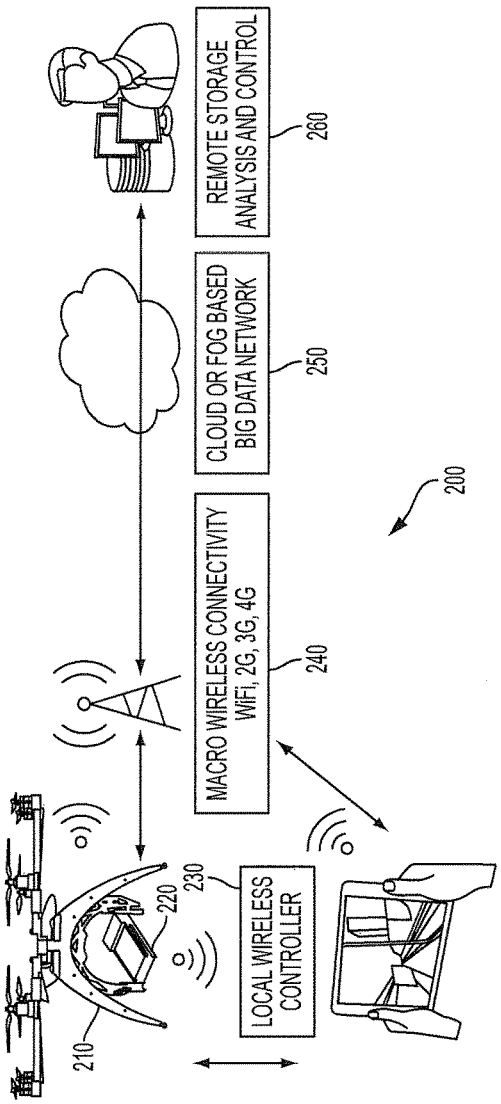
FIG. 2 is a block diagram of a system in accordance with disclosed embodiments.

In some embodiments, the scanning device as disclosed herein can utilize integrated WiFi and/or Bluetooth wireless links for communicating with land-based host servers to acquire instructions and to upload or download data. For example, FIG. 2 is a block diagram of a system 200 in accordance with disclosed embodiments. As seen in FIG. 2, a scanning device 220 can be affixed to a UAV 210 and can wirelessly connect to and exchange data with a local wireless controller 230 and with remote control and storage system devices 260. For example, U.S. Pat. No. 8,422,461 issued Apr. 16, 2013 and titled "Self-Configurable Wireless Network with Cooperative Interference Measurements by Base Station", which is assigned to the assignee hereof and is hereby incorporated by reference, discloses one system and method for a scanning device communicating with a controller, but embodiments disclosed herein are not so limited.

The scanning device 220 shown in FIG. 2 can contain an integrated wireless interface for establishing wireless connectivity with the local wireless controller 220 and/or with a local wireless base station 240 or router using standard or proprietary wireless protocols, including WiFi, BT, 2G, 3G, 4G, and the like. The scanning device 220 can communicate with the remote control and storage system devices 260 via the local wireless base station 240, which can interface with the devices 260 via a cloud or fog based network 250. In some embodiments, the remote control and storage system devices 260 can monitor the scanning device 220 and can dynamically interact with the scanning device 220.

In some embodiments, the scanning device disclosed herein can automatically identify and store RF points of interest. Furthermore, in some embodiments, the scanning device can correlate the RF points of interest to GPS coordinates and instruct the associated UAV to traverse a flight path, for example, a secondary flight path that covers the GPS coordinates.

For example, the system disclosed herein can include a GPS receiver, for example, an antenna, that can collect coordinate data and information. U.S. Pat. No. 5,663,734 issued Sep. 2, 1997 and titled "GPS Receiver and Method for Processing GPS Signals" discloses one such exemplary GPS receiver. Indeed, in some embodiments disclosed herein, the GPS receiver can collect, format, and export GPS coordinate information and transmit the GPS coordinate information, for example, via a text message, to the scanning device disclosed herein. In some embodiments, the GPS receiver can transmit a message with the GPS coordinate information to the scanning device in a format that is compliant with NMEA 0183. Furthermore, in some embodiments, the GPS receiver can transmit a message with the GPS coordinate information to the scanning device via a powered USB that can connect the devices.

Once received, the scanning device can process the GPS coordinate information and, in some embodiments, include such information with other data communicated to land-based host servers, including the local wireless controllers, local wireless base stations, and remote control and storage system devices, as discussed above. The utilization of GPS coordinates as discussed above can facilitate the system, apparatus, and method disclosed herein collecting data from specific points of interest rather than coordinates defined merely in X, Y, and Z coordinates.

In accordance with the above, FIG. 3 is a block diagram of a system 300 in accordance with disclosed embodiments. As seen in FIG. 3, the system 300 can include a scanning device 320 that can receive data and information from a GPS receiver 370, which can communicate with a GPS satellite 380 as would be known by those of skill in the art. The scanning device 320 can then communicate GPS coordinate information to land-based host servers, including the local wireless controller 230, local wireless base station 240, and remote control and storage system devices 260, as discussed above and as shown in FIG. 2.

In some embodiments, the system disclosed herein can include an elevation storage device that can be used in conjunction with output from the GPS receiver and/or the scanning device. For example, the elevation storage device can include an altimeter and can be used to collect elevation data. In some embodiments, a system, apparatus, and method disclosed herein can identify relevant no fly zones based on collected GPS and elevation data.

In accordance with the above, FIG. 4 is a block diagram of a system 400 in accordance with disclosed embodiments. As seen in FIG. 4, the system 400 can include a scanning device 420 that can receive data and information from an altimeter 470. The scanning device 420 can then communicate altimeter elevation information to land-based host servers, including the local wireless controller 230, local wireless base station 240, and remote control and storage system devices 260, as discussed above and as shown in FIG. 2.

It is to be understood that the system 300 of FIG. 3 and the system 400 of FIG. 4 can be combined such that a system in accordance with disclosed embodiments can include a GPS receiver 370 and/or an altimeter 470. For example, information obtained from an altimeter 470 can complement and/or supplement information obtained from a GPS receiver 370.

In some embodiments, a system, apparatus, and method disclosed herein can fill in gaps in coverage in an RF three-dimensional model. For example, the system, apparatus, and method can identify the gaps in the model after collection of data and determine locations from which data should be collected again, for example, during a secondary flight.

Figure 5A:
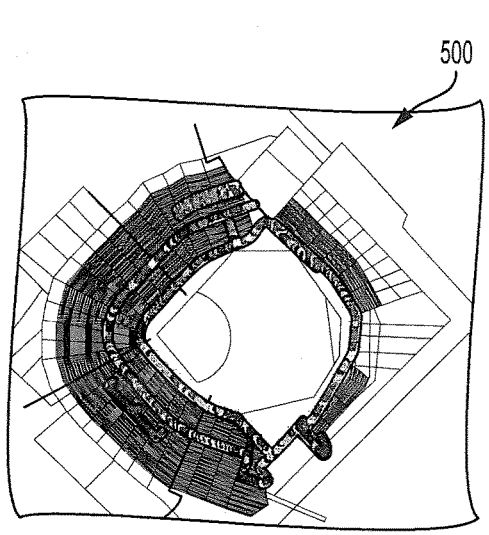
FIG. 5A is a two-dimensional map of an exemplary target location.
Figure 5B:
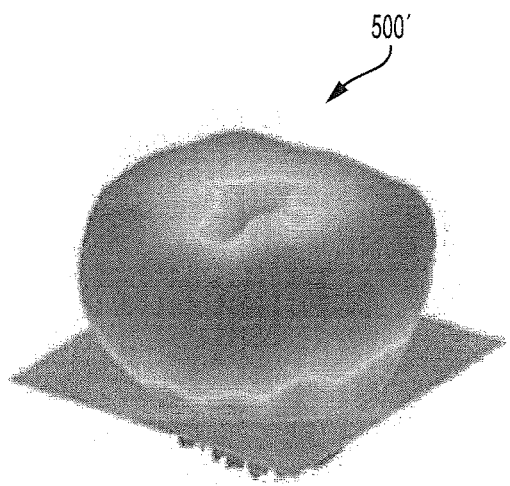
FIG. 5B is a three-dimensional model representation of data collected from a target location in accordance with disclosed embodiments.

FIG. 5A is a two-dimensional stadium map 500 of an exemplary target location. The system, apparatus, and method disclosed herein can collect and analyze radio signal data from the target location and generate a three-dimensional model representation 500' of such data, as illustrated in FIG. 5B. The scanning device disclosed herein can autonomously and/or through remote control, analyze the three-dimensional coverage model to determine whether there are any points with insufficient or indeterminate data necessary for the satisfactory conversion of the three-dimensional survey. If any such gaps are detected, the scanning device can then identify the three-dimensional coordinates of those gaps and, autonomously and/or through remote control, instruct and direct the associated UAV to return to target locations corresponding to those gaps and collect data until the gap in coverage is reconciled and resolved. For example, control circuitry, programmable processors, and control devices in the scanning device can be integrally connected with a navigation system in the UAV.

Figure 6:
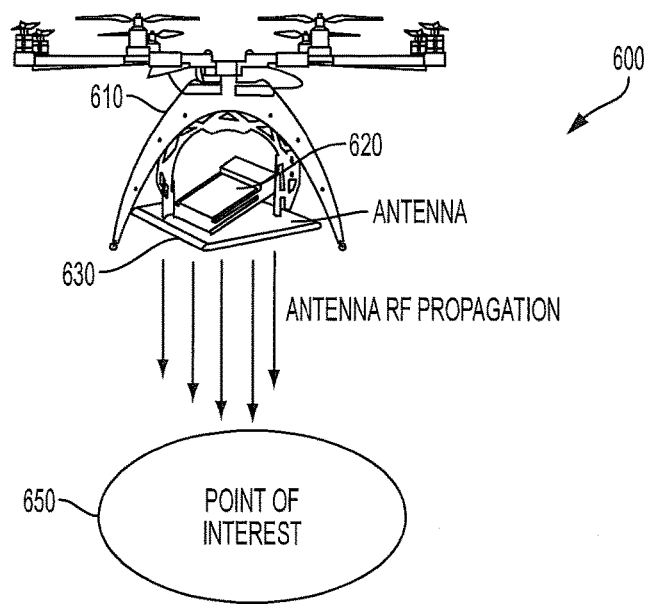
FIG. 6 is a block diagram of a system in accordance with disclosed embodiments.

In some embodiments, a system, apparatus, and method disclosed herein can include or be associated with an antenna system to simulate ground coverage from predetermined elevation parameters. For example, in some situations, a UAV or other autonomous vehicle will be unable to reach or get within a desired predetermined distance of a point of interest. Accordingly, in some embodiments, an antenna system can be installed on a UAV and/or its associated scanning device and can be used to estimate coverage at the point of interest. For example, FIG. 6 is a block diagram of a system 600 in accordance with disclosed embodiments and shows an antenna system 630 installed on a UAV 610 and associated with a scanning device 620. As seen, the antenna system 630 can be installed on the bottom of the UAV 610. In some embodiments, the antenna system 630 can include a directional antenna and can capture estimated coverage at the point of interest 650, thereby improving safety of data collection, reducing time in data collection, and producing accurate data.

Figure 7:
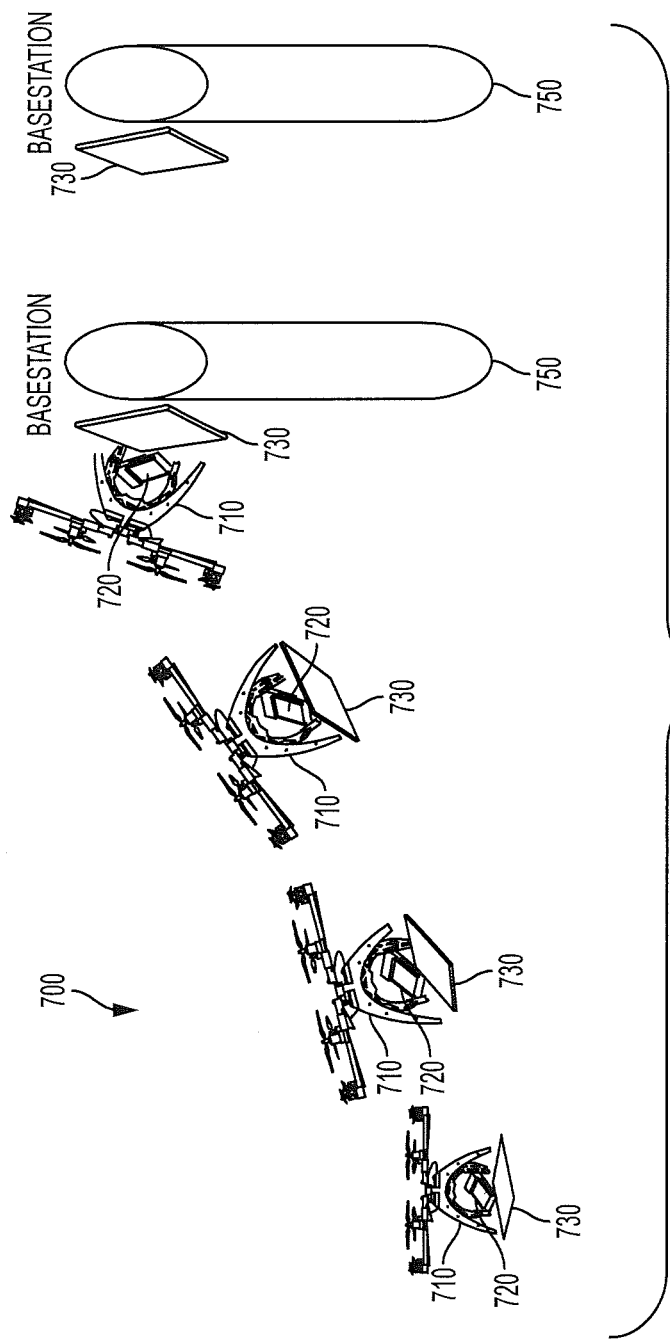
FIG. 7 is a block diagram of a system in accordance with disclosed embodiments.

Additionally or alternatively, in some situations, a UAV or other autonomous vehicle can easily reach a point of interest. For example, FIG. 7 is a block diagram of a system 700 in accordance with disclosed embodiments and shows an antenna system 730 installed on a UAV 710, for example, on the bottom of the UAV 710. As seen, the UAV 710 can approach the point of interest 750, for example, a base station, and physically install the antenna system 730 on the base station 750. Such installation can facilitate emergency on-site antenna coverage to the base station 750 and provide wireless coverage in the area surrounding the base station 750. Furthermore, after the UAV 710 installs the antenna system 730 on the base station 750, the scanning device 720 associated with the UAV 710 can scan the installed antenna system 730 to verify functional operation of the base station 750 and the antenna system 730.

Figure 9:
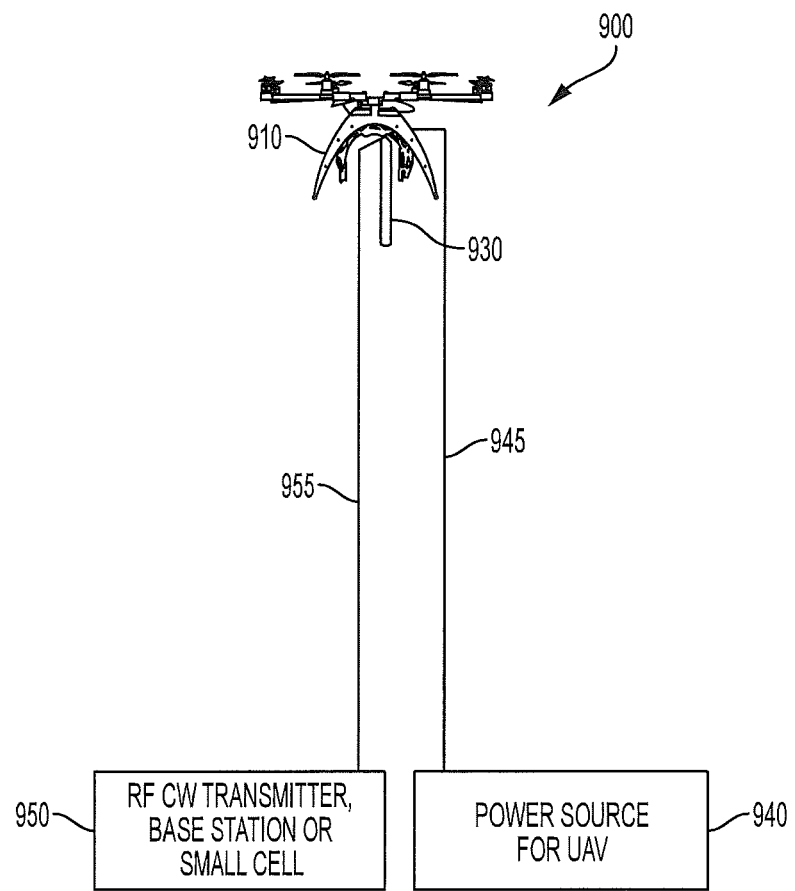
FIG. 9 is a block diagram of a system in accordance with disclosed embodiments.

Additionally or alternatively, in some situations, a UAV can approach a point of interest for the testing thereof. For example, FIG. 9 is a block diagram of a system 900 in accordance with disclosed embodiments in position for testing a point of interest 950. As seen, a UAV 910 can be tethered to a power supply 940 remotely located from the UAV 910 via a tether 945, which can transmit power from the power supply 940 to the UAV 910. In some embodiments, the power supply 940 can be located on the ground.

Similarly, an antenna system 930 installed on the UAV 910 can be tethered to the point of interest 950 via a tether 955. In some embodiments, the point of interest 950 can include an RF continuous wave (CW) transmitter, and a continuous wave can be continuously communicated between the transmitter 950 and the antenna system 930, via the tether 955, thereby facilitating the antenna system 930 testing radio propagation for cell site selection. In some embodiments, the point of interest 950 can include a base station or a small cell, and an actual signal can be communicated between the base station or small cell 950 and the antenna system 930, via the tether 955, thereby facilitating emergency on-site antenna coverage to the point of interest 950 and providing wireless coverage in the area surrounding the point of interest 950.

Figure 10:
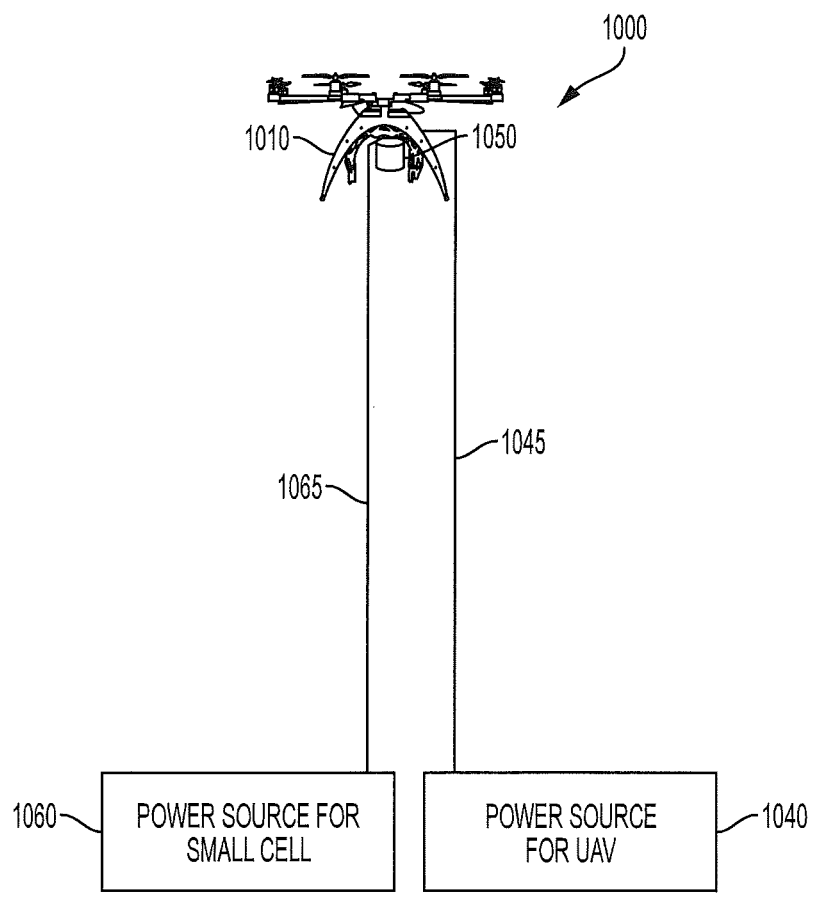
FIG. 10 is a block diagram of a system in accordance with disclosed embodiments.

Additionally or alternatively, a small cell 1050 can be installed on a UAV 1010, for example, the bottom of the UAV 1010, as seen in the system 1000 shown in FIG. 10. In these embodiments, while the UAV 101 is tethered to the power supply 1040, via the tether 1045, the small cell 1050 can be tethered to a power source 1060, via a tether 1065, and receive power therefrom. That is, the small cell 1050 installed on the UAV 1010 can be powered separately from the UAV 1010.

Figure 8:
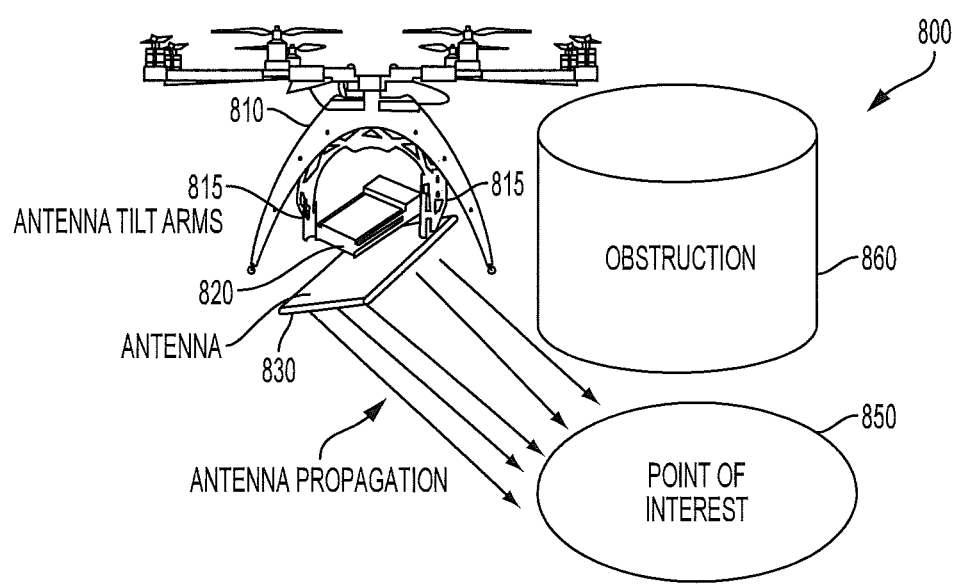
FIG. 8 is a block diagram of a system in accordance with disclosed embodiments.

In some embodiments, a system, apparatus, and method disclosed herein can include an antenna tilt system that supports the motion of the scanning device and/or antenna system independent of the motion of the UAV, thereby facilitating directional, stable, and consistent data collection irrespective of UAV movement, for example, when the flight path or direction of the UAV quickly changes. FIG. 8 is a block diagram of a system 800 in accordance with disclosed embodiments and shows a scanning device 820 and an antenna system 830 connected to antenna tilt arms 815 of a UAV 810. The antenna tilt arms 815 can move the scanning device 820 and antenna system 830 independent of motion of the UAV 810 so that the scanning device 820 and antenna system 830 can be directed towards a point of interest 850 for data collection therefrom, even when the UAV 810 moves to avoid an obstruction 860 in the vicinity of the point of interest 850. In some embodiments, the antenna system 830 can smooth data collection, causing transparency in any movement of the UAV 810.

In some embodiments, a system, apparatus, and method disclosed herein can automatically detect and store interference signals. For example, a UAV can host a radio signal interference detection apparatus and system that can be separate from and/or integral with a scanning device as disclosed herein. In some embodiments, the radio signal interference detection apparatus and system can include a radio signal sensor, a wide band directionally sensitive antenna, and/or a wide band omnidirectional antenna. The system, apparatus, and method disclosed herein can identify radio signals that are suspected of causing interference, and the radio signal sensor can monitor those signals. Further, the system, apparatus, and method disclosed herein can identify the directionality of the signals suspected of causing interference and, based on such identification, instruct the associated UAV to maneuver in three-dimensional space, for example, by circling an area near such signals to facilitate the efficient collection of target signals from a plurality of directions and locations. In some embodiments, data from the target signals collected by one or more radio signal interference detection apparatuses and systems can be combined with data from the signals suspected of causing interference, in real time or in post processing, to enhance the continued collection of target signals and to ultimately triangulate and avoid the locations from which the interfering signals originate.

In accordance with the above, in some embodiments, the scanning device and/or the radio signal interference detection apparatus and system can communicate collected data and data from the signals suspected of causing interference to land-based host servers, including the local wireless controller, local wireless base station, and remote control and storage system devices, as discussed above and as shown in FIG. 4, for real-time data aggregation and analysis. Furthermore, in some embodiments, a plurality of radio signal interference detection apparatuses and systems can be associated with respective ones of UAVs strategically positioned in three-dimensional space. In these embodiments, each radio signal interference detection apparatus and system can simultaneously collect, analyze, and communicate data to optimally and efficiently determine the location of interfering radio signals.

It is to be understood that the UAV, scanning device, and/or the land-based host servers as shown and described herein can include control circuitry and/or programmable processors that can executed software stored on a non-transitory computer readable medium that, when executed can facilitate and/or perform any and all of the methods and capabilities of the system, apparatus, and method described above.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a transport host device; and
a scanning device connected to the transport host device,
wherein the scanning device autonomously collects radio data from at least one wireless network,
wherein the transport host device, autonomously or via remote control, transports the scanning device to target locations that enable the scanning device to collect the radio data from the at least one wireless network,
wherein the scanning device dynamically generates a flight path or a secondary flight path for the transport host device based on the radio data and an analysis thereof,
wherein the analysis of the radio data includes generating an RF three-dimensional model representing the radio data and identifying at least one gap in the three-dimensional model, and wherein dynamically generating the secondary flight path includes identifying the target locations corresponding to the at least one gap and instructing the transport host device to return to the target locations corresponding to the at least one gap for the scanning device to re-collect the radio data until the at least one gap is reconciled.

2. The system of claim 1 wherein the transport host device includes at least one of an unmanned aerial vehicle, drone, and an autonomous transportation vehicle.

3. The system of claim 1 wherein the scanning device analyzes the radio data in real time.

4. The system of claim 1 wherein the analysis of the radio data includes identifying interference signals and directionalities thereof.

5. The system of claim 1 wherein the scanning device stores the radio data.

6. The system of claim 1 wherein the scanning device wirelessly transmits the radio data, in real time, to a remote location.

7. The system of claim 1 further comprising a power source carried by the scanning device, wherein the power source provides power to both the scanning device and the transport host device.

8. The system of claim 1 further comprising an altimeter connected to or integral with the scanning device, wherein the altimeter transmits elevation data to the scanning device, and wherein the scanning device dynamically generates the flight path or the secondary flight path for the transport host device based on the radio data, the elevation data, and the analysis thereof or wirelessly transmits the radio data and the elevation data, in real time, to a remote location.

9. The system of claim 1 further comprising an antenna system for simulating ground coverage, wherein the antenna system is connected to the transport host device or to the scanning device.

10. The system of claim 9 wherein the transport host device installs the antenna system on a point of interest, and wherein the scanning device tests the installed antenna system for successful installation.

11. The system of claim 9 wherein the antenna system is connected to the transport host device or the scanning device via antenna tilt arms that move the antenna system and the scanning device independent of motion of the transport host device.

12. An apparatus comprising:
at least one RF sensor;
at least one connection mechanism;
a programmable processor; and
executable control software stored on a non-transitory computer readable medium,
wherein the programmable processor and the executable control software instruct the at least one RF sensor to collect radio data from at least one wireless network,
wherein the at least one connection mechanism connects with a transport host device for, autonomously or via remote control, transporting the at least one RF sensor to target locations that enable the at least one RF sensor to collect the radio data from the at least one wireless network,
wherein the programmable processor and the executable control software dynamically generate a flight path or a secondary flight path for the transport host device based on the radio data and an analysis thereof,
wherein the analysis of the radio data includes generating an RF three-dimensional model representing the radio data and identifying at least one gap in the three-dimensional model, and wherein dynamically generating the secondary flight path includes identifying the target locations corresponding to the at least one gap and instructing the transport host device to return to the target locations corresponding to the at least one gap for the at least one RF sensor to re-collect the radio data until the at least one gap is reconciled.

13. The apparatus as in claim 12 wherein the programmable processor and the executable control software analyze the radio data in real time.

14. The apparatus as in claim 12 wherein the analysis of the radio data includes identifying interference signals and directionalities thereof.

15. The apparatus as in claim 12 further comprising a storage device, wherein the storage device stores the radio data.

16. The apparatus as in claim 12 further comprising a transceiver, wherein the transceiver wirelessly transmits the radio data, in real time, to a remote location.

17. The apparatus as in claim 12 further comprising a power source, wherein the power source provides power to the at least one RF sensor, the programmable processor, and the transport host device.

18. The apparatus as in claim 12 further comprising an altimeter for identifying elevation data, wherein the programmable processor and the executable control software dynamically generate the flight path or the secondary flight path for the transport host device based on the radio data, the elevation data, and the analysis thereof.

19. The apparatus as in claim 12 further comprising an antenna system for simulating ground coverage.

20. The apparatus as in claim 19 wherein the transport host device installs the antenna system on a point of interest, and wherein the RF sensor, the programmable processor, and the executable control software test the installed antenna system for successful installation.

21. The apparatus as in claim 19 further comprising antenna tilt arms, wherein the antenna tilt arms move the antenna system independently of motion of the transport host device.

22. A method comprising:
a transport host device, autonomously or via remote control, transporting a scanning device to a plurality of target locations;
the scanning device autonomously collecting radio data from at least one wireless network at at least some of the plurality of target locations; and
the scanning device dynamically generating a flight path or a secondary flight path for the transport host device based on the radio data and an analysis thereof,
wherein the analysis of the radio data includes the scanning device generating an RF three-dimensional model representing the radio data and identifying at least one gap in the three-dimensional model, and
wherein dynamically generating the secondary flight path includes the scanning device identifying the target locations corresponding to the at least one gap and instructing the transport host device to return to the target locations corresponding to the at least one gap for the scanning device to re-collect the radio data until the at least one gap is reconciled.

23. The method of claim 22 further comprising the scanning device analyzing the radio data in real time.

24. The method of claim 23 wherein the scanning device analyzing the radio data includes the scanning device identifying interference signals and directionalities thereof.

25. The method of claim 23 further comprising the scanning device storing the radio data.

26. The method of claim 22 further comprising the scanning device wirelessly transmitting the radio data, in real time, to a remote location.

27. The method of claim 22 further comprising:
the scanning device carrying a power source; and
the power source providing power to both the scanning device and the transport host device.

28. The method of claim 22 further comprising:
an altimeter identifying elevation data;
the altimeter transmitting the elevation data to the scanning device; and
the scanning device dynamically generating the flight path or the secondary flight path for the transport host device based on the radio data, the elevation data, and the analysis thereof, or, the scanning device wirelessly transmitting the radio data and the elevation data, in real time, to a remote location.

29. The method of claim 22 further comprising an antenna system simulating ground coverage.

30. The method of claim 29 further comprising:
the transport host device installing the antenna system on a point of interest; and
the scanning device testing the installed antenna system for successful installation.

31. The method of claim 22 further comprising:
connecting the antenna system to the transport host device or the scanning device via antenna tilt arms; and
moving the antenna system and the scanning device independently of motion of the transport host device.

* * * * *